US008979122B2

(12) United States Patent
Ramp

(10) Patent No.: US 8,979,122 B2
(45) Date of Patent: Mar. 17, 2015

(54) COMBUSTION CHAMBER SCREEN, ESPECIALLY FOR AN INFLATOR, INFLATOR, AIRBAG MODULE VEHICLE SAFETY SYSTEM AND METHOD OF MANUFACTURING A COMBUSTION CHAMBER SCREEN

(71) Applicant: TRW Airbag Systems GmbH, Aschau am Inn (DE)

(72) Inventor: Manfred Ramp, Waldkrailburg (DE)

(73) Assignee: TRW Airbag Systems GmbH, Aschau am Inn (DE)

( * ) Notice: Subject to any disclaimer, the term of this patent is extended or adjusted under 35 U.S.C. 154(b) by 0 days.

(21) Appl. No.: 14/053,645

(22) Filed: Oct. 15, 2013

(65) Prior Publication Data

US 2014/0117652 A1    May 1, 2014

(30) Foreign Application Priority Data

Oct. 30, 2012   (DE) .......................... 10 2012 021 204

(51) Int. Cl.
*B60R 21/264* (2006.01)
*B60R 21/272* (2006.01)
*B60R 21/26* (2011.01)

(52) U.S. Cl.
CPC ........... *B60R 21/2644* (2013.01); *B60R 21/272* (2013.01); *B60R 2021/26011* (2013.01)
USPC .......................................... 280/736; 280/741

(58) Field of Classification Search
CPC .......................... B60R 21/272; B60R 21/2644
USPC .......................................... 280/741, 740, 736
See application file for complete search history.

(56) References Cited

U.S. PATENT DOCUMENTS

| | | | | |
|---|---|---|---|---|
| 5,236,675 A | * | 8/1993 | Swain et al. ................. | 422/305 |
| 5,340,150 A | * | 8/1994 | Harada et al. ................ | 280/740 |
| 5,345,875 A | * | 9/1994 | Anderson ...................... | 102/530 |
| 5,398,967 A | * | 3/1995 | Carothers et al. ............. | 280/741 |
| 5,468,016 A | * | 11/1995 | Kobari et al. ................ | 280/741 |
| 5,624,133 A | * | 4/1997 | Wong ........................... | 280/740 |
| 5,829,785 A | * | 11/1998 | Jordan et al. ................. | 280/741 |
| 5,876,062 A | * | 3/1999 | Hock ........................... | 280/736 |
| 5,938,236 A | * | 8/1999 | Tanaka et al. ................ | 280/741 |
| 6,170,868 B1 | * | 1/2001 | Butt et al. ..................... | 280/737 |
| 6,189,925 B1 | * | 2/2001 | Reichtalhammer et al. .. | 280/736 |
| 6,244,623 B1 | * | 6/2001 | Moore et al. .................. | 280/737 |
| 6,332,404 B1 | * | 12/2001 | Rink et al. .................... | 102/530 |
| 6,474,685 B1 | * | 11/2002 | Meixner et al. ............... | 280/741 |
| 6,634,302 B1 | * | 10/2003 | Rink et al. .................... | 102/530 |
| 6,886,855 B2 | * | 5/2005 | Cheal et al. .................. | 280/741 |
| 6,935,655 B2 | * | 8/2005 | Longhurst et al. ............ | 280/736 |

(Continued)

FOREIGN PATENT DOCUMENTS

| | | |
|---|---|---|
| DE | 636 484 | 11/1936 |
| DE | 29819168 | 4/1999 |
| DE | 19851263 | 6/1999 |
| DE | 29906173 | 9/1999 |
| DE | 20212384 | 5/2003 |

*Primary Examiner* — Nicole Verley
(74) *Attorney, Agent, or Firm* — Tarolli, Sundheim, Covell & Tummino LLP

(57) ABSTRACT

The invention relates to a combustion chamber screen, especially for an inflator, that includes plural flow orifices and bent segments. In accordance with the invention, the bent segments are arranged around a center (M) of the combustion chamber screen so that in the circumferential direction of the combustion chamber screen (10) a waveform having plural wave peaks (12) and wave troughs (13) is formed.

32 Claims, 4 Drawing Sheets

(56) References Cited

U.S. PATENT DOCUMENTS

| | | | |
|---|---|---|---|
| 7,293,796 B2* | 11/2007 | Meixner et al. | 280/736 |
| 8,142,534 B2* | 3/2012 | Whang et al. | 55/385.3 |
| 8,720,944 B2* | 5/2014 | Kobayashi et al. | 280/741 |
| 2004/0026910 A1 | 2/2004 | Englbrecht et al. | |
| 2008/0136154 A1* | 6/2008 | Lindqvist et al. | 280/741 |

* cited by examiner

US 8,979,122 B2

COMBUSTION CHAMBER SCREEN, ESPECIALLY FOR AN INFLATOR, INFLATOR, AIRBAG MODULE VEHICLE SAFETY SYSTEM AND METHOD OF MANUFACTURING A COMBUSTION CHAMBER SCREEN

BACKGROUND OF THE INVENTION

The invention relates to a combustion chamber screen, especially for an inflator, comprising plural flow orifices and bent segments. In addition, the invention relates to an inflator, an airbag module as well as a vehicle safety system. Furthermore the invention relates to a method of manufacturing a combustion chamber screen.

Occupant restraint systems for automotive vehicles usually include airbag modules comprising an airbag which is inflated in the case of impact so as to reduce the probability of a collision of body parts of a vehicle occupant with a vehicle component and to protect a vehicle occupant against the effects of high negative accelerating forces, respectively. For inflating the airbag in the case of impact usually inflators are provided which comprise a combustion chamber filled with solid propellant and including a discharge end. Inflators have at least one igniter unit for igniting the solid propellant, thereby hot gas for inflating the airbag being generated. Moreover at least one combustion chamber screen can be provided which is positioned at the discharge end of the combustion chamber and is adjacent to the solid propellant.

At present combustion chamber screens in the form of hemispherical components are known. Combustion chamber screens of this type require a mounting state oriented in the inflator so as to ensure optimum hot gas flow in terms of fluidics toward a connected inflator component. In this case, by way of example, a hot gas flow toward a connected nozzle which closed by a burst plate having a connected pressure reservoir is mentioned.

It can be beneficial in this case that the hemispherical top of the afore-mentioned combustion chamber screen is positioned toward the combustion chamber, i.e. in the direction of the igniter unit, whereas a mounting state rotated about 180°, i.e. the hemispherical top facing away from the combustion chamber, is detrimental with respect to the afore-mentioned hot gas flow.

SUMMARY OF THE INVENTION

It is the object of the present invention to describe a further developed combustion chamber screen, wherein the combustion chamber screen requires no additional orientation when being mounted in an inflator and can further be mounted while being rotated by 180° without its effect being changed. It is another object of the invention to provide an inflator, an airbag module as well as a vehicle safety system comprising a combustion chamber screen of this type.

In accordance with the invention, this object is achieved with respect to the further developed combustion chamber screen by the characterizing portion of claim 1.

Hence, according to the invention, bent segments are arranged around a center of the combustion chamber screen so that the combustion chamber screen is wave-shaped having plural wave peaks and wave troughs.

The advantage of the combustion chamber screen according to the invention consists in the fact that due to the shape of the screen according to the invention the latter requires no additional orientation when being mounted in an inflator so that the combustion chamber screen can also be mounted in the inflator when rotated by 180°.

The combustion chamber screen can have such shape that at least two wave peaks, especially at least three wave peaks, especially at least four wave peaks, especially at least five wave peaks, especially at least six wave peaks, especially at least seven wave peaks, especially at least eight wave peaks, especially at least nine wave peaks, especially at least ten wave peaks are formed.

Furthermore at least two wave troughs, especially at least three wave troughs, especially at least four wave troughs, especially at least five wave troughs, especially at least six wave troughs, especially at least seven wave troughs, especially at least eight wave troughs, especially at least nine wave troughs, especially at least ten wave troughs can be formed.

In an especially preferred embodiment of the invention the wave peaks ascend starting from the center toward the circumferential edge of the combustion chamber screen. Alternatively or additionally, the wave troughs descend starting from the center toward the circumferential edge of the combustion chamber screen.

According to a preferred embodiment of the combustion chamber screen according to the invention the center of the combustion chamber screen is formed as flow orifice.

It is noted that the combustion chamber screen preferably has a round base shape so that the center of the combustion chamber screen is defined by the center of the round base shape. If the base shape of the combustion chamber screen has an elliptic or polygonal such as four-sided, rectangular or square shape, for example, the geometric center of the base shape forms the center of the combustion chamber screen.

The outer edge of the combustion chamber screen is referred to as circumferential edge. Such outer edge further defines the circumferential direction of the combustion chamber screen. In other words, the circumferential edge is the edge of the combustion chamber screen most distant from the center.

Concerning the waveform having plural wave peaks and wave troughs formed in the circumferential direction of the combustion chamber screen, it is referred to the fact that the combustion chamber screen substantially has a disk-shaped structure despite the formation of wave peaks and wave troughs. Substantially disk-shaped in this context means that the combustion chamber screen is not dome-shaped or hemispherical. The disk shape is evident from a side view on the circumferential edge. It shows that a disk shape is provided despite the formation of wave peaks and wave troughs.

In other words, a point located on the circumferential edge of the combustion chamber screen which performs a movement in the circumferential direction of the combustion chamber screen describes a waveform comprising plural wave peaks and wave troughs after moving once over the complete circumferential edge. The wave peaks and/or wave troughs can be tapered. It is further possible that the wave peaks and/or wave troughs are arc-shaped or trapezoid so that a point provided on the circumferential edge which once completely orbits the circumferential edge performs a substantially sinusoidal or trapezoidal movement.

The combustion chamber screen can be designed to be preferably axially symmetric, the axis of symmetry extending through the center of the combustion chamber screen. The axis of symmetry further can extend through a wave trough and/or through a wave peak. It is further possible that the combustion chamber screen is designed to be point symmetric or rotationally symmetric, wherein in both mentioned cases the center of the combustion chamber screen serves as point of symmetry.

The wave peaks and/or the wave troughs can be formed by flanks arranged in V-shape. The center line of the shaped V can define a wave peak and/or a wave trough. It is mentioned that a flank forming a wave trough at the same time can serve as a flank of the neighboring wave peak with respect to the adjacently arranged wave peak. Depending on the way of viewing the combustion chamber screen, a flank is thus always part of a wave peak and of a wave trough. Since, as already described, wave peaks ascend starting from the center toward the circumferential edge of the combustion chamber screen, the flanks grow wider starting from the center in the direction of the circumferential edge.

Due to the wave shape having plural wave peaks and wave troughs formed in the circumferential direction of the combustion chamber screen, the combustion chamber screen can be rotated by 180° in the inflator. An originally formed wave trough is turned into a wave peak by rotating the combustion chamber screen by 180°. Inversely, an originally formed wave peak is turned into a wave trough after a 180° rotation. The approximately disk-shaped combustion chamber screen thus can be mounted while being rotated by 180° without altering its effect, as the combustion chamber screen exhibits the same shape in both mounting positions due to its symmetric design.

The flanks forming the wave peaks and/or the wave troughs have a substantially planar shape and/or enclose an angle of from 1° to 179°, especially an angle of from 10° to 100°, especially an angle of from 20° to 90°, especially an angle of from 30° to 60°, especially an angle of from 40° to 50°. The given angular dimensions relate to the angles formed at the outermost ends of the flanks, i.e. at the circumferential edge of the combustion chamber screen. In an especially preferred embodiment of the invention all angles formed by the flanks are equal, i.e. all angles have the same angular dimension. However, it can also be provided that the flanks of the combustion chamber screen enclose angles of different dimensions.

The height distance between the wave troughs and the wave peaks is 4 mm to 8 mm, especially 5 mm to 7 mm, especially 6.8 mm. The height distance between the wave troughs and the wave peaks can be measured or determined in a side view onto the combustion chamber screen. The height distance between the wave troughs and the wave peaks relates to the distance between the outermost point of the wave trough and the outermost point of the wave peak. The outermost points of the wave peak and the wave trough, respectively, are described to be the points of the circumferential edge having the largest distance from the plane in which the center of the combustion chamber screen is located.

The center of the combustion chamber screen is located in a plane which bisects the height distance between the wave troughs and the wave peaks. All segments of the combustion chamber screen provided below the central plane are part of the wave troughs, whereas all segments of the combustion chamber screen located above the central plane are part of the wave peaks. After rotation about 180° of the combustion chamber screen also the afore-defined wave troughs and wave peaks are reversed so that the originally defined wave troughs have to be referred to as wave peaks after rotation and the originally defined wave peaks now form the wave troughs.

The flow orifices of the combustion chamber screen can be provided on concentrically arranged circles, the concentric circles being arranged about the center of the combustion chamber screen. Preferably all flow orifices arranged on a joint concentric circle have the same diameter. Of preference, at least two concentric circles having flow orifices formed are arranged around the center of the combustion chamber screen.

As regards an inflator, the object is achieved by the features of claim 6.

Such inflator according to the invention includes a combustion chamber screen according to the invention. Furthermore, the inflator has at least a combustion chamber, wherein said combustion chamber is filled with solid propellant and furthermore includes a discharge end. Moreover, at least one igniter unit is provided for igniting the solid propellant. Further the inflator comprises at least one combustion chamber screen according to the invention adjacent to the solid propellant at the discharge end and delimiting the combustion chamber.

The solid propellant used can be, for example, NTO (nitrotriazolone) compressed in tablet shape and a chemical compound based on GuNi (guanidine nitrate).

As regards an airbag module, the object is achieved by the features of claim 13. Accordingly, an airbag module comprises in inflator according to the invention including an airbag inflatable by an inflator and a fastening group for attaching the airbag module to a vehicle.

As regards a vehicle safety system, the object is achieved by the features of claim 8. Accordingly, the vehicle safety system includes, especially for protecting a person, for example a vehicle occupant or pedestrian, an inflator according to the invention, especially comprising an airbag module, and an electronic control unit by means of which the inflator can be activated in the case of a trigger situation.

As regards a method of manufacturing a combustion chamber screen, the object is achieved by the features of claim 10. Accordingly, a disk which is especially made of metal is interposed between a matrix and a punch so that during a punching/embossing or bending operation the bent segments as well as the wave peaks and wave troughs can be shaped. In particular, in at least one preceding step the disk and/or the flow orifices through the disk can have been punched. The punching method according to the invention is a cost-efficient method which can be easily implemented.

BRIEF DESCRIPTION OF THE DRAWINGS

Hereinafter the invention shall be explained in detail by way of an embodiment with reference to the enclosed representations in which.

DESCRIPTION OF EMBODIMENT

Figure 1:
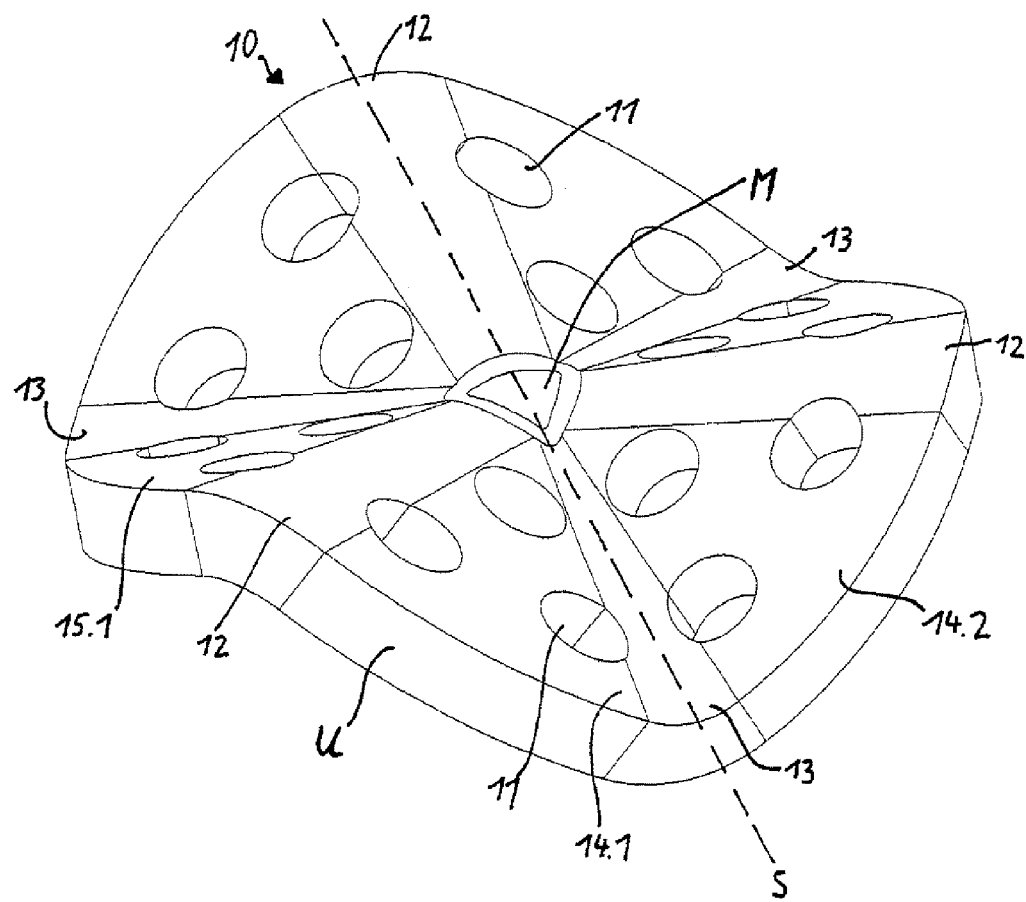
FIG. 1 shows a perspective view of a combustion chamber screen according to the invention in accordance with a preferred embodiment.

FIG. 1 illustrates a preferred embodiment of the combustion chamber screen 10 according to the invention, said combustion chamber screen 10 having plural flow orifices 11. The combustion chamber screen 10 comprises plural bent segments, the bent segments being arranged about a center M of the combustion chamber screen such that a waveform having plural wave peaks 12 and wave troughs 13 is formed in the circumferential direction of the combustion chamber screen 10.

In the embodiment according to FIG. 1 the combustion chamber screen according to the invention includes three wave peaks 12 and three wave troughs 13. Starting from the center M of the combustion chamber screen in the direction of the circumferential edge U of the combustion chamber screen the wave peaks 12 are ascending, whereas the wave troughs 13 are descending starting from the center M in the direction of the circumferential edge U. In the preferred embodiment of the combustion chamber screen according to the invention the center M of the combustion chamber screen is designed as flow orifice. With respect to an axis of symmetry S extending through the center M of the combustion chamber screen and at the same time extending through a wave trough 13 and a wave peak 12, the combustion chamber screen 10 is designed to be axially symmetric.

The wave peaks 12 and the wave troughs 13 are formed by flanks arranged in V-shape. The flanks 14.1 and 14.2 are arranged in V-shape and form the wave trough 13. Since the wave trough 13 descends starting from the center M toward the circumferential edge U of the combustion chamber screen, the flanks 14.1 and 14.2 grow wider starting from the center M toward the circumferential edge. The wave peak 12 formed on the left next to the described wave trough 13 is equally formed of two flanks arranged in V-shape, wherein the V-shape formed points in a direction opposed to the wave trough 13. The flank 14.1 initially forming a wave trough 13 with the flank 14.2 is also part of the wave peak 12 adjacent on the left and forms the wave peak 12 by a V-shaped arrangement with the flank 15.1.

Figure 2:
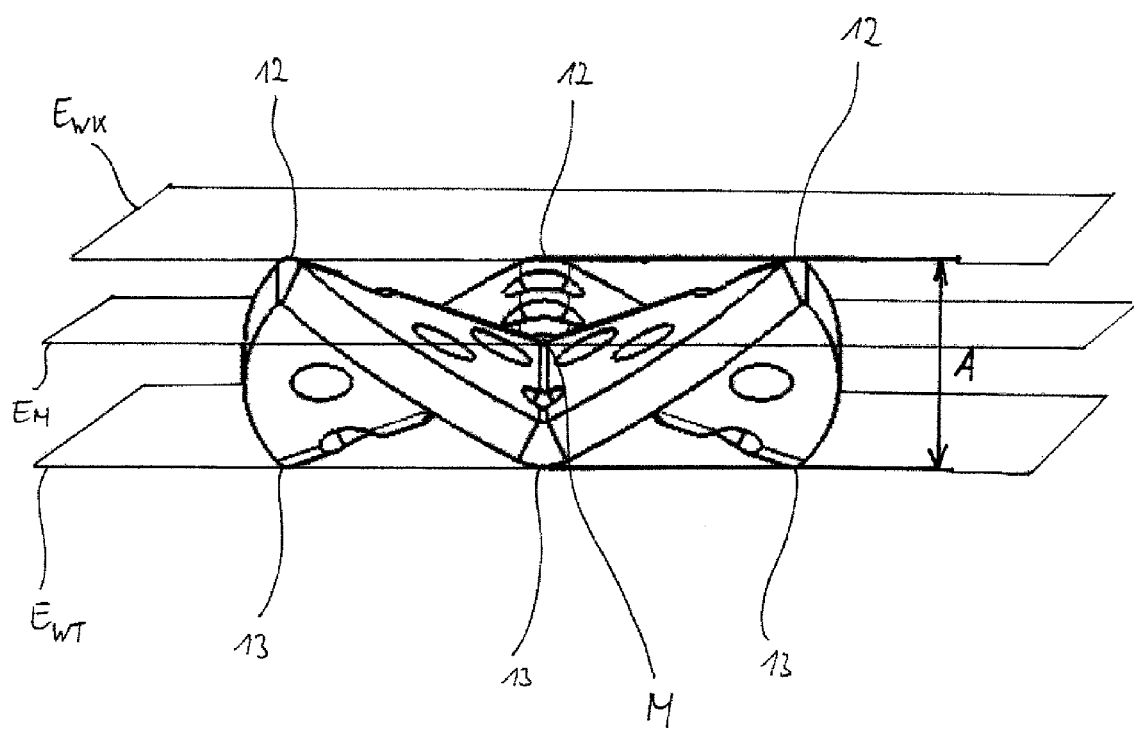
FIG. 2 shows a side view of the combustion chamber screen according to the invention in accordance with FIG. 1.

It is resulting from FIG. 2 that the two flanks 14.1 and 14.2 enclose an angle of 100°. In the present case all flanks forming wave troughs and all flanks forming wave peaks enclose an angle of 100°.

As is shown in FIG. 2, the center M of the combustion chamber screen 10 is located in a plane $E_M$. In FIG. 2 the wave peaks 12 are shown above said plane $E_M$, wherein the maximum points of the wave peaks 12 are equally located in a joint plane $E_{WK}$. The plane $E_{WK}$ is located parallel to the plane $E_M$. Below the plane $E_M$ the wave troughs 13 are formed. In the present case three wave peaks 12 and three wave troughs 13 are formed. The outermost points of the wave troughs 13 located most distant from the plane $E_M$ are equally located in a joint plane $E_{WT}$. The plane $E_{WT}$ is arranged in parallel to the planes $E_M$ and $E_{WK}$.

The height distance between the wave troughs 13 and the wave peaks 12 illustrated in FIG. 2 amounts to 6.8 mm so that the plane $E_{WK}$ and $E_{WT}$ are spaced apart from each other in parallel at 6.8 mm. The height distance is measured between the outermost points of the wave troughs and the outermost points of the wave peaks. The outermost points of the wave troughs are the points having the largest distance from the center M of the combustion chamber screen and being located on the joint plane $E_{WT}$. The outermost points of the wave peaks are the points having the largest distance from the center M of the combustion chamber screen and being located on the joint plane $E_{WK}$.

Figure 3:
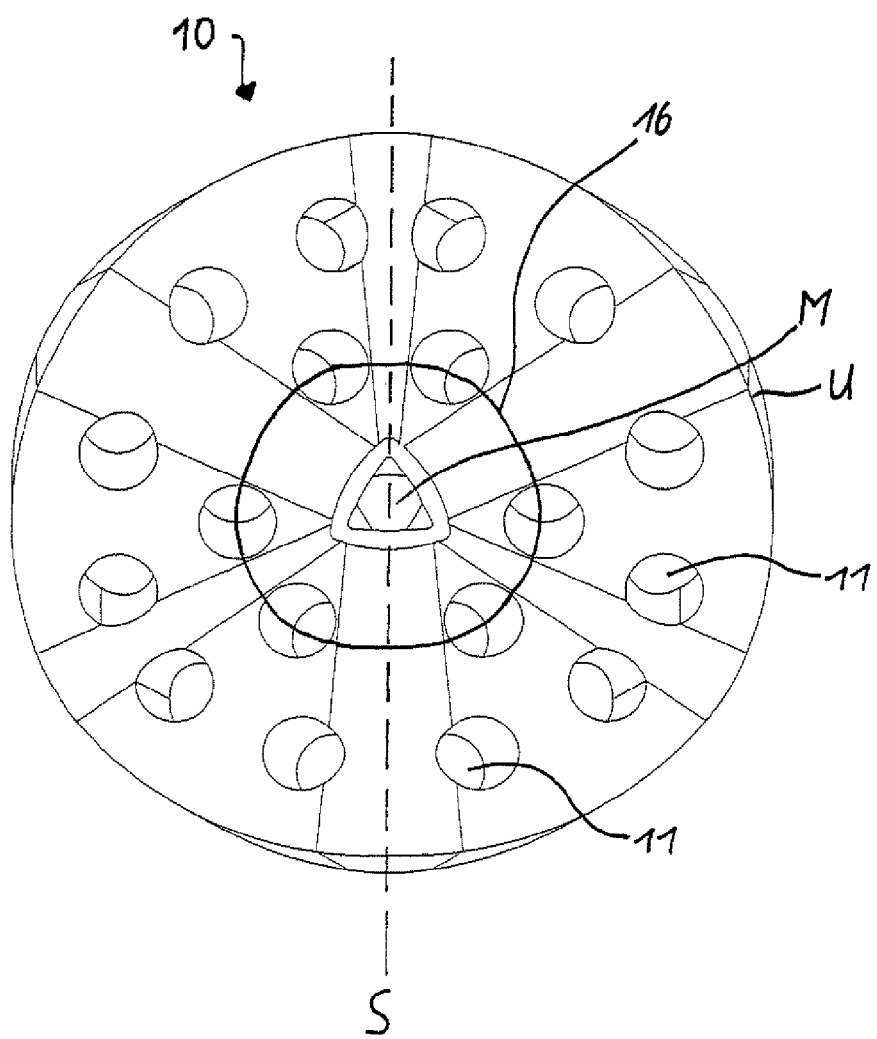
FIG. 3 shows a top view of a combustion chamber screen according to the invention in accordance with FIG. 1.
Figure 4:
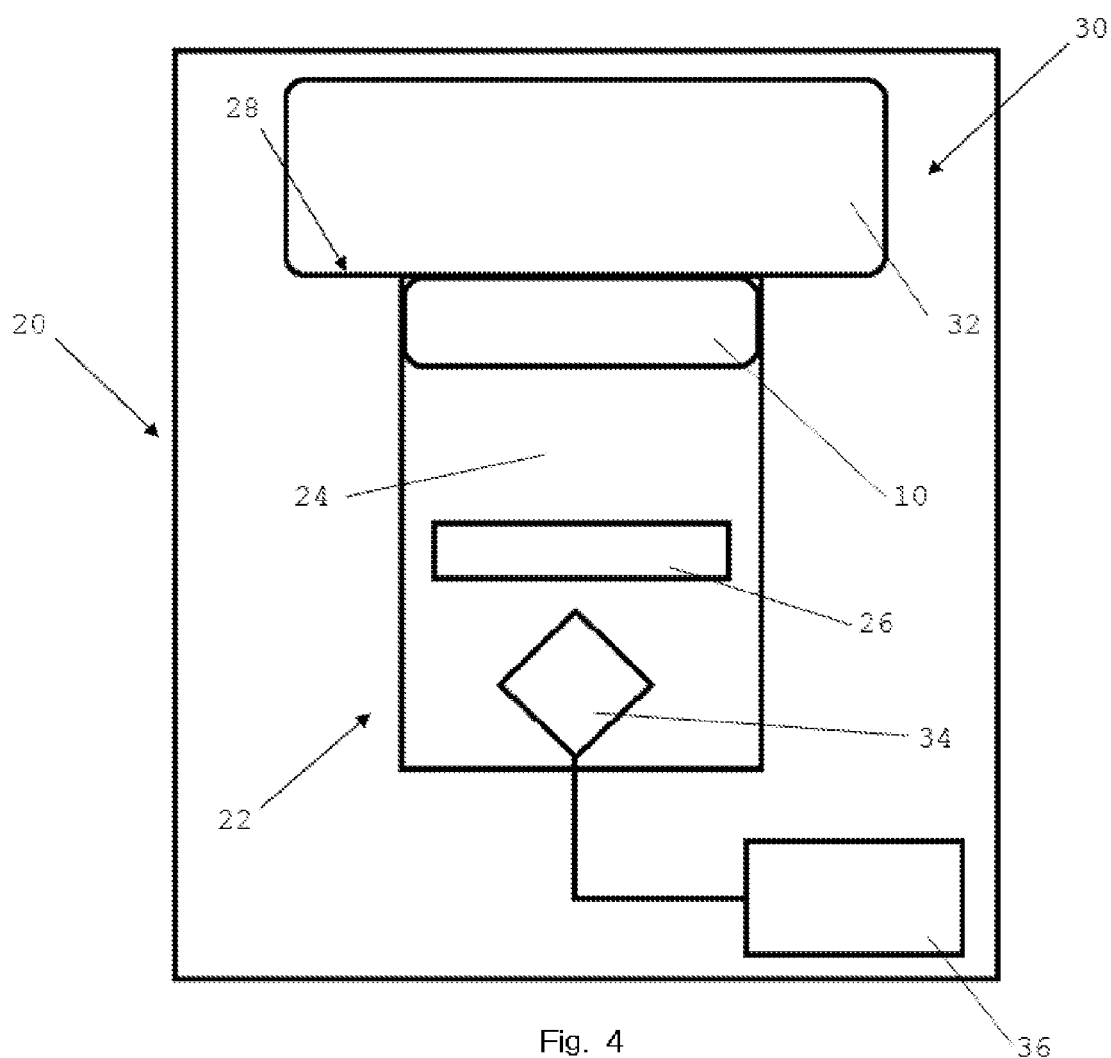
FIG. 4 shows a highly schematized vehicle safety system employing the combustion chamber shown in FIGS. 1-3.

From FIG. 3 it is evident that the combustion chamber screen initially consists of a flat metal disk having through holes 11. Said perforated disk is interposed, according to the method according to the invention, between a matrix and a punch so that during a punching/embossing and, resp., bending operation the bent segments as well as the wave peaks and wave troughs are formed. Especially in at least one preceding method step the disk itself and/or the flow orifices through the disk can have been punched.

The through holes 11 are provided on concentrically arranged circles, wherein said concentrically arranged circles 16 are disposed around the center M. Through holes 11 provided on wave peaks 12 or in wave troughs 13 or are arranged in the areas thereof are also bent by the afore-mentioned punching/embossing and bending operation. In this way such through holes 11 which originally had a round/circular shape will exhibit a respective geometrically distorted shape after the punching/embossing and bending operation.

The inflators, airbag modules and vehicle safety systems according to the invention are provided with combustion chamber screens 10 according to the invention in accordance with the embodiments shown in FIGS. 1 to 3.

LIST OF REFERENCE NUMERALS 10 combustion chamber screen
11 flow orifice
12 wave peak
13 wave trough
14.1, 14.2, 15.1 flank
16 concentric circle
M center of combustion chamber screen
U circumferential edge
S axis of symmetry
$E_M$ plane of center
$E_{WK}$ plane of wave peak
$E_{WT}$ plane of wave trough
A distance
20 vehicle safety system
22 inflator
24 combustion chamber
26 solid propellant
28 discharge end
30 airbag module
32 airbag

The invention claimed is:

1. A combustion chamber screen (10) for an inflator, comprising plural flow orifices (11) and bent segments, wherein the bent segments are arranged around a center (M) of the combustion chamber screen so that in the circumferential direction of the combustion chamber screen a waveform including plural wave peaks (12) and wave troughs (13) is formed, wherein the wave peaks (12) are ascending starting from the center (M) toward the circumferential edge (U) of the combustion chamber screen.

2. The combustion chamber screen according to claim 1, wherein at least two wave peaks (12) are formed.

3. The combustion chamber screen according to claim 1, wherein substantially planar flanks (14.1, 14.2) are arranged in a V-shape form at least one of the wave peaks (12) and the wave troughs (13).

4. The combustion chamber screen according to claim 1, wherein the height distance (A) between the wave troughs (13) and the wave peaks (12) is 4 to 8 mm, wherein the center (M) of the combustion chamber screen is located in a plane ($E_M$) which bisects the height distance (A) between the wave troughs (13) and the wave peaks (12).

5. An inflator comprising a combustion chamber screen according to claim 1.

6. An airbag module comprising an inflator, an airbag inflatable by the inflator and a fastening group for attaching the airbag module to a vehicle, characterized in that the inflator is configured in accordance with claim 5.

7. A vehicle safety system, especially for protecting a person, for example a vehicle occupant or a pedestrian, comprising:
    an inflator, especially including an airbag module, and an electronic control unit by means of which the inflator can be activated when a trigger situation is provided, wherein the inflator is configured in accordance with claim 5.

8. An inflator comprising:
   at least one combustion chamber filled with solid propellant and having a discharge end,
   at least one igniter unit by which the solid propellant can be ignited and
   at least one combustion chamber screen according to claim 1 which is adjacent to the solid propellant at the discharge end and delimits the combustion chamber.

9. An airbag module comprising an inflator, an airbag inflatable by the inflator and a fastening group for attaching the airbag module to a vehicle, characterized in that the inflator is configured in accordance with claim 8.

10. A vehicle safety system, especially for protecting a person, for example a vehicle occupant or a pedestrian, comprising:
   an inflator, especially including an airbag module, and an electronic control unit by means of which the inflator can be activated when a trigger situation is provided, wherein the inflator is configured in accordance with claim 8.

11. A method of manufacturing a combustion chamber screen according to claim 1, wherein a disk is interposed between a matrix and a punch and during at least one of a punching, embossing, and bending operation the bent segments as well as the wave peaks and wave troughs are formed, wherein in at least one of the punching, embossing, and bending steps, the disk and/or flow orifices through the disk have been punched.

12. The combustion chamber screen according to claim 1, wherein at least two wave troughs (13) are formed.

13. The combustion chamber screen according to claim 1, wherein the center (M) of the combustion chamber screen is designed as flow orifice.

14. The combustion chamber screen according to claim 1, wherein the combustion chamber screen is formed to be axially symmetric and the axis of symmetry (S) extends through the center (M) of the combustion chamber screen.

15. The combustion chamber screen according to claim 1, wherein the wave peaks (12) and/or the wave troughs (13) are formed by flanks (14.1; 14.2) arranged in V-shape.

16. The combustion chamber screen according to claim 15 wherein the flanks (14.1, 14.2) are formed to enclose an angle of from 1° to 179°.

17. A combustion chamber screen (10) for an inflator, comprising plural flow orifices (11) and bent segments, wherein the bent segments are arranged around a center (M) of the combustion chamber screen so that in the circumferential direction of the combustion chamber screen a waveform including plural wave peaks (12) and wave troughs (13) are formed, wherein the wave troughs (13) are descending starting from the center (M) toward the circumferential edge (U) of the combustion chamber screen.

18. The combustion chamber screen according to claim 17, wherein at least two wave peaks (12) are formed.

19. The combustion chamber screen according to claim 17, wherein substantially planar flanks (14.1, 14.2) arranged in a V-shape form at least one of the wave peaks (12) and the wave troughs (13).

20. The combustion chamber screen according to claim 17, wherein the height distance (A) between the wave troughs (13) and the wave peaks (12) is 4 to 8 mm, wherein the center (M) of the combustion chamber screen is located in a plane ($E_M$) which bisects the height distance (A) between the wave troughs (13) and the wave peaks (12).

21. An inflator comprising a combustion chamber screen according to claim 17.

22. An airbag module comprising an inflator, an airbag inflatable by the inflator and a fastening group for attaching the airbag module to a vehicle, characterized in that the inflator is configured in accordance with claim 21.

23. A vehicle safety system, especially for protecting a person, for example a vehicle occupant or a pedestrian, comprising:
   an inflator, especially including an airbag module, and an electronic control unit by means of which the inflator can be activated when a trigger situation is provided, wherein the inflator is configured in accordance with claim 21.

24. An inflator comprising:
   at least one combustion chamber filled with solid propellant and having a discharge end,
   at least one igniter unit by which the solid propellant can be ignited and
   at least one combustion chamber screen according to claim 17 which is adjacent to the solid propellant at the discharge end and delimits the combustion chamber.

25. An airbag module comprising an inflator, an airbag inflatable by the inflator and a fastening group for attaching the airbag module to a vehicle, characterized in that the inflator is configured in accordance with claim 24.

26. A vehicle safety system, especially for protecting a person, for example a vehicle occupant or a pedestrian, comprising:
   an inflator, especially including an airbag module, and an electronic control unit by means of which the inflator can be activated when a trigger situation is provided, wherein the inflator is configured in accordance with claim 24.

27. A method of manufacturing a combustion chamber screen according to claim 17, wherein a disk is interposed between a matrix and a punch and during at least one of a punching, embossing, and bending operation the bent segments as well as the wave peaks and wave troughs are formed, wherein in at least one of the punching, embossing, and bending steps, the disk and/or flow orifices through the disk have been punched.

28. The combustion chamber screen according to claim 27, wherein the flanks (14.1, 14.2) are formed to enclose an angle of from 1° to 179°.

29. The combustion chamber screen according to claim 17, wherein at least two wave troughs (13) are formed.

30. The combustion chamber screen according to claim 17, wherein the center (M) of the combustion chamber screen is designed as flow orifice.

31. The combustion chamber screen according to claim 17, wherein the combustion chamber screen is formed to be axially symmetric and the axis of symmetry (S) extends through the center (M) of the combustion chamber screen.

32. The combustion chamber screen according to claim 17, wherein the wave peaks (12) and/or the wave troughs (13) are formed by flanks (14.1; 14.2) arranged in V-shape.

* * * * *